United States Patent
Motgi et al.

(10) Patent No.: US 12,488,043 B2
(45) Date of Patent: Dec. 2, 2025

(54) SYSTEM AND METHOD FOR MANAGING STORAGE OF DATA IN A SET OF STORAGE TIERS

(71) Applicant: Dell Products L.P., Round Rock, TX (US)

(72) Inventors: Prem Pradeep Motgi, Austin, TX (US); Dharmesh M. Patel, Round Rock, TX (US); Manpreet Singh Sokhi, Santa Clara, CA (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/458,389

(22) Filed: Aug. 30, 2023

(65) Prior Publication Data
US 2025/0077574 A1   Mar. 6, 2025

(51) Int. Cl.
*G06F 16/65* (2019.01)
(52) U.S. Cl.
CPC .................................. *G06F 16/65* (2019.01)
(58) Field of Classification Search
CPC ........................................................ G06F 16/65
See application file for complete search history.

(56) References Cited

U.S. PATENT DOCUMENTS

| | | | |
|---|---|---|---|
| 5,649,060 A | | 7/1997 | Ellozy et al. |
| 6,606,620 B1 * | | 8/2003 | Sundaresan ............. G06F 16/30 |
| 8,117,235 B1 | | 2/2012 | Barta |
| 8,255,386 B1 | | 8/2012 | Annau et al. |

(Continued)

FOREIGN PATENT DOCUMENTS

| | | |
|---|---|---|
| CN | 202058147 U | 11/2011 |
| CN | 115292285 A | 11/2022 |

(Continued)

OTHER PUBLICATIONS

Page, Sébastien, "How to move your Health data from one iPhone to another," iDB, Web Page <https://www.idownloadblog.com/2016/10/13/health-data-importer-makes-moving-your-health-data-from-one-iphone-to-another-a-breeze/> accessed on Oct. 30, 2022 (9 Pages).

(Continued)

*Primary Examiner* — Khanh B Pham
*Assistant Examiner* — Brooks T Hale
(74) *Attorney, Agent, or Firm* — WOMBLE BOND DICKINSON (US) LLP

(57) ABSTRACT

Methods and systems for managing storage of data in a set of storage tiers are disclosed. To manage storage of data, data management system may analyze data to identify topic classifications and topic rankings for the data. Data management system may prioritize storage of data in higher performing storage tiers based on the relevancy of the data for one or more purposes with respect to an individual. To identify relevant data with respect to the individual for which data is being stored, data management system may analyze data, including audio recordings of interactions between the individual and other individuals to identify topics relevant to the individual. Based on the identified topics, data management system may establish a relevancy quantification for the portions of data and use the relevancy quantification to select a storage tier in which to store the portion of the data.

20 Claims, 8 Drawing Sheets

(56) References Cited

U.S. PATENT DOCUMENTS

| | | | |
|---|---|---|---|
| 8,255,948 B1* | 8/2012 | Black | H04N 21/812 |
| | | | 725/35 |
| 8,335,688 B2 | 12/2012 | Yegnanarayanan et al. | |
| 8,412,521 B2 | 4/2013 | Mathias et al. | |
| 8,495,720 B2 | 7/2013 | Counterman | |
| 9,031,839 B2 | 5/2015 | Thorsen et al. | |
| 9,361,428 B2 | 6/2016 | Bessette | |
| 9,571,890 B1 | 2/2017 | Diamondstein | |
| 9,781,097 B2 | 10/2017 | Grajek et al. | |
| 10,042,993 B2 | 8/2018 | Beigi | |
| 10,073,948 B2 | 9/2018 | Cohen et al. | |
| 10,157,275 B1 | 12/2018 | Venkatasamy et al. | |
| 10,462,142 B2 | 10/2019 | Pattar et al. | |
| 10,701,056 B2 | 6/2020 | Murthy | |
| 10,896,681 B2 | 1/2021 | Aleksic et al. | |
| 10,904,237 B2 | 1/2021 | Murthy et al. | |
| 11,010,392 B1 | 5/2021 | Hirsch et al. | |
| 11,094,402 B2 | 8/2021 | Brown et al. | |
| 11,217,331 B2 | 1/2022 | Vishnubhatla et al. | |
| 11,405,189 B1 | 8/2022 | Bennison | |
| 11,631,401 B1 | 4/2023 | Nudd | |
| 11,763,821 B1 | 9/2023 | McNair | |
| 11,849,069 B1 | 12/2023 | Can | |
| 12,135,708 B2 | 11/2024 | Chermside | |
| 2003/0046401 A1 | 3/2003 | Abbott | |
| 2005/0160166 A1 | 7/2005 | Kraenzel | |
| 2006/0007870 A1 | 1/2006 | Roskowski | |
| 2008/0154961 A1 | 6/2008 | Dougall | |
| 2008/0275701 A1 | 11/2008 | Wu et al. | |
| 2009/0171692 A1 | 7/2009 | Zilberman et al. | |
| 2009/0216746 A1 | 8/2009 | Aubin | |
| 2010/0169304 A1 | 7/2010 | Hendricksen et al. | |
| 2011/0072233 A1* | 3/2011 | Dawkins | G06F 12/0223 |
| | | | 711/E12.001 |
| 2011/0131174 A1 | 6/2011 | Birch et al. | |
| 2012/0265771 A1 | 10/2012 | Suh | |
| 2014/0181673 A1 | 6/2014 | Work | |
| 2014/0201199 A1 | 7/2014 | Hajaj | |
| 2014/0207885 A1* | 7/2014 | Baker | G06F 16/13 |
| | | | 709/206 |
| 2014/0344288 A1 | 11/2014 | Evans | |
| 2015/0169574 A1 | 6/2015 | Bau et al. | |
| 2015/0199268 A1 | 7/2015 | Davis et al. | |
| 2015/0356127 A1 | 12/2015 | Pierre et al. | |
| 2016/0006839 A1 | 1/2016 | Sawazaki | |
| 2016/0062689 A1* | 3/2016 | Cherubini | G06F 3/0608 |
| | | | 711/159 |
| 2016/0164813 A1 | 6/2016 | Anderson | |
| 2016/0231928 A1* | 8/2016 | Lewis | G06F 3/0638 |
| 2016/0232159 A1 | 8/2016 | Parikh | |
| 2016/0275158 A1 | 9/2016 | Baset | |
| 2016/0306812 A1 | 10/2016 | McHenry et al. | |
| 2016/0378760 A1 | 12/2016 | Braz | |
| 2017/0013047 A1 | 1/2017 | Hubbard | |
| 2017/0018026 A1 | 1/2017 | Rigdon | |
| 2017/0262164 A1 | 9/2017 | Jain | |
| 2017/0365101 A1 | 12/2017 | Samec et al. | |
| 2018/0024845 A1 | 1/2018 | Card, II et al. | |
| 2018/0121502 A1 | 5/2018 | Prieur | |
| 2018/0181560 A1 | 6/2018 | Qiao | |
| 2018/0189352 A1 | 7/2018 | Ghafourifar | |
| 2018/0203612 A1 | 7/2018 | Kats et al. | |
| 2018/0225345 A1 | 8/2018 | Gilder | |
| 2019/0012931 A1 | 1/2019 | Candelore | |
| 2019/0279744 A1 | 9/2019 | Howley et al. | |
| 2019/0297035 A1 | 9/2019 | Fox et al. | |
| 2019/0325036 A1 | 10/2019 | Edge | |
| 2020/0043479 A1 | 2/2020 | Mont-Reynaud | |
| 2020/0110882 A1 | 4/2020 | Ripolles Mateu et al. | |
| 2020/0226216 A1 | 7/2020 | Marin et al. | |
| 2020/0258516 A1 | 8/2020 | Khaleghi | |
| 2021/0056131 A1 | 2/2021 | Ackermann et al. | |
| 2021/0065203 A1 | 3/2021 | Billigmeier et al. | |
| 2021/0256534 A1 | 8/2021 | An | |
| 2021/0390196 A1 | 12/2021 | Lavine et al. | |
| 2022/0019560 A1* | 1/2022 | Durairaj | G06F 9/45558 |
| 2022/0027859 A1 | 1/2022 | Daga | |
| 2022/0261152 A1 | 8/2022 | Jude et al. | |
| 2022/0293087 A1 | 9/2022 | Kumar | |
| 2022/0334719 A1 | 10/2022 | Thrane | |
| 2022/0366131 A1 | 11/2022 | Ekron | |
| 2023/0029634 A1 | 2/2023 | Teeple | |
| 2023/0058470 A1 | 2/2023 | Chandrashekar et al. | |
| 2023/0061725 A1 | 3/2023 | Khan | |
| 2023/0068099 A1 | 3/2023 | Abramenko et al. | |
| 2023/0137931 A1 | 5/2023 | Song | |
| 2023/0156085 A1 | 5/2023 | Yachiku | |
| 2023/0221911 A1 | 7/2023 | Bandameedipalli | |
| 2023/0333767 A1* | 10/2023 | Macgaffey | H04L 67/568 |
| 2024/0112597 A1 | 4/2024 | Kim | |
| 2024/0248592 A1 | 7/2024 | Zerhusen | |
| 2025/0013642 A1 | 1/2025 | Yang | |

FOREIGN PATENT DOCUMENTS

| | | |
|---|---|---|
| JP | 4808173 B2 | 11/2011 |
| JP | 2015-106406 A | 6/2015 |
| WO | 2023/220948 A1 | 11/2023 |

OTHER PUBLICATIONS

"MyChart," Web Page <https://www.mychart.org/> accessed on Oct. 30, 2022 (6 Pages).

Xu, Jie et al., "Federated learning for healthcare informatics," Journal of Healthcare Informatics Research 5 (2021):1-19. (19 Pages).

Naz, Sadaf et al., "A comprehensive review of federated learning for COVID-19 detection," International Journal of Intelligent Systems 37.3 (2022): 2371-2392. (22 Pages).

Prasser, Fabian, et al., "Efficient and effective pruning strategies for health data de-identification," BMC medical informatics and decision making 16.1 (2016): 1-14. (14 Pages).

"FollowMyHealth®," Allscripts Healthcare Solutions Inc, Google Play Store, Web Page <https://play.google.com/store/apps/details?id=com.jardogs.fmhmobile&hl=en_US&gl=US> accesed on Jan. 8, 2023 (4 Pages).

"Speech Recognition," Web Accessibility Initiative. Web Page <https://www.w3.org/WAI/perspective-videos/voice/> accessed on Aug. 30, 2023 (6 Pages).

"Text Size," Web Accessibility Initiative. Web Page <https://www.w3.org/WAI/GL/low-vision-a11y-tf/wiki/Text_Size> accessed on Aug. 30, 2023 (5 Pages).

Mesko, Bertlan, "The Top 10 Health Chatbots," The Medical Futurist, Aug. 1, 2023, Web Page <https://medicalfuturist.com/top-10-health-chatbots/> accessed on Aug. 30, 2023 (11 Pages).

Longoni, Chiara et al., "AI Can Outperform Doctors. So Why Don't Patients Trust It?" Harvard Business Review, Oct. 30, 2019, Web Page <https://hbr.org/2019/10/ai-can-outperform-doctors-so-why-dont-patients-trust-it> accessed on Aug. 30, 2023 (7 Pages).

"Doctor Ai," DDXRX, Web Page <https://www.ddxrx.com/> accessed on Aug. 30, 2023 (7 Pages).

"Multi-Factor Authentication and Voice Biometrics," Voice Biometrics Group, Feb. 2021, Web Page <https://www.voicebiogroup.com/starting/multi-factor-authentication-and-voice-biometrics.html> accessed on Aug. 30, 2023 (6 Pages).

Wallace, Byron C et al. "Automatically annotating topics in transcripts of patient-provider interactions via machine learning." Medical decision making : an international journal of the Society for Medical Decision Making vol. 34,4(2014): 503-12. doi:10.1177/0272989X13514777 (20 Pages).

"Medical Transcription Analysis with Machine Learning—Doctor/Patient Conversation Demo,"Amazon Web Services, Jun. 16, 2021, Web Page <https://www.youtube.com/watch?v=f5HVIALG5g4> accessed on Aug. 30, 2023 (2 Pages).

Baxendale, Simran et al., "Performing medical transcription analysis with Amazon Transcribe Medical and Amazon Comprehend Medical," Amazon Web Services, May 8, 2020, Web Page <https://aws.amazon.com/blogs/machine-learning/performing-medical-

(56) References Cited

OTHER PUBLICATIONS transcription-analysis-with-amazon-transcribe-medical-and-amazon-comprehend-medical/> accessed on Aug. 30, 2023 (12 Pages).
Sullivan, Todd et al., "Speaker Identification and Geographical Region Prediction in Audio Reviews," Department of Computer Science, Stanford University, 2023 (4 Pages).
"Finding Local Destinations with Siri's Regionally Specific Language Models for Speech Recognition," Apple Machine Learning Research, Aug. 2018, Web Page <https://machinelearning.apple.com/research/regionally-specific-language-models> accessed on Aug. 30, 2023 (9 Pages).
Tyagi, Nemika et al., "Demystifying the Role of Natural Language Processing (NLP) in Smart City Applications: Background, Motivation, Recent Advances, and Future Research Directions." Wireless Personal Communications 130.2 (2023): 857-908. (52 Pages).
Alozie, Emeka, "The AI Surgeon's Assistant: How Generative AI is Revolutionizing the Operating Room," Apr. 20, 2023, Web Page <https://intuitivex.com/tpost/p7bhza9611-the-ai-surgeons-assistant-how-generative> accessed on Aug. 30, 2023 (9 Pages).
Gaitan, Michelle, "Researchers at UTSA use artificial intelligence to improve cancer treatment," University of Texas at San Antonio, Apr. 18, 2023, Web Page <https://www.utsa.edu/today/2023/04/story/researchers-use-artifical-intelligence-to-improve-cancer-treatments.html> accessed on Aug. 30, 2023 (4 Pages).
Bohr, Adam et al., "The rise of artificial intelligence in healthcare applications." Artificial Intelligence in Healthcare (2020): 25-60. doi:10.1016/B978-0-12-818438-7.00002-2 (37 Pages).
"Introducing Healthcare-Specific Large Language Models from John Snow Labs," KDnuggets, Apr. 28, 2023, Web Page <https://www.kdnuggets.com/2023/04/john-snow-introducing-healthcare-specific-large-language-models-john-snow-labs.html> accessed on Aug. 30, 2023 (7 Pages).
Balaskas, Georgios, et al., "An end-to-end system for transcription, translation, and summarization to support the co-creation process. A Health CASCADE Study", ACM PETRA '23, published Aug. 10, 2023, pp. 625-631. (Year: 2023) (7 Pages).
D. Fedasyuk and I. Lutsyk, "Tools for adaptation of a mobile application to the needs of users with cognitive impairments," 2021 IEEE 16th International Conference on Computer Sciences and Information Technologies (CSIT), Lviv, Ukraine, 2021, pp. 321-324, doi: 10.1109/CSIT52700.2021.9648702. (Year: 2021).

* cited by examiner

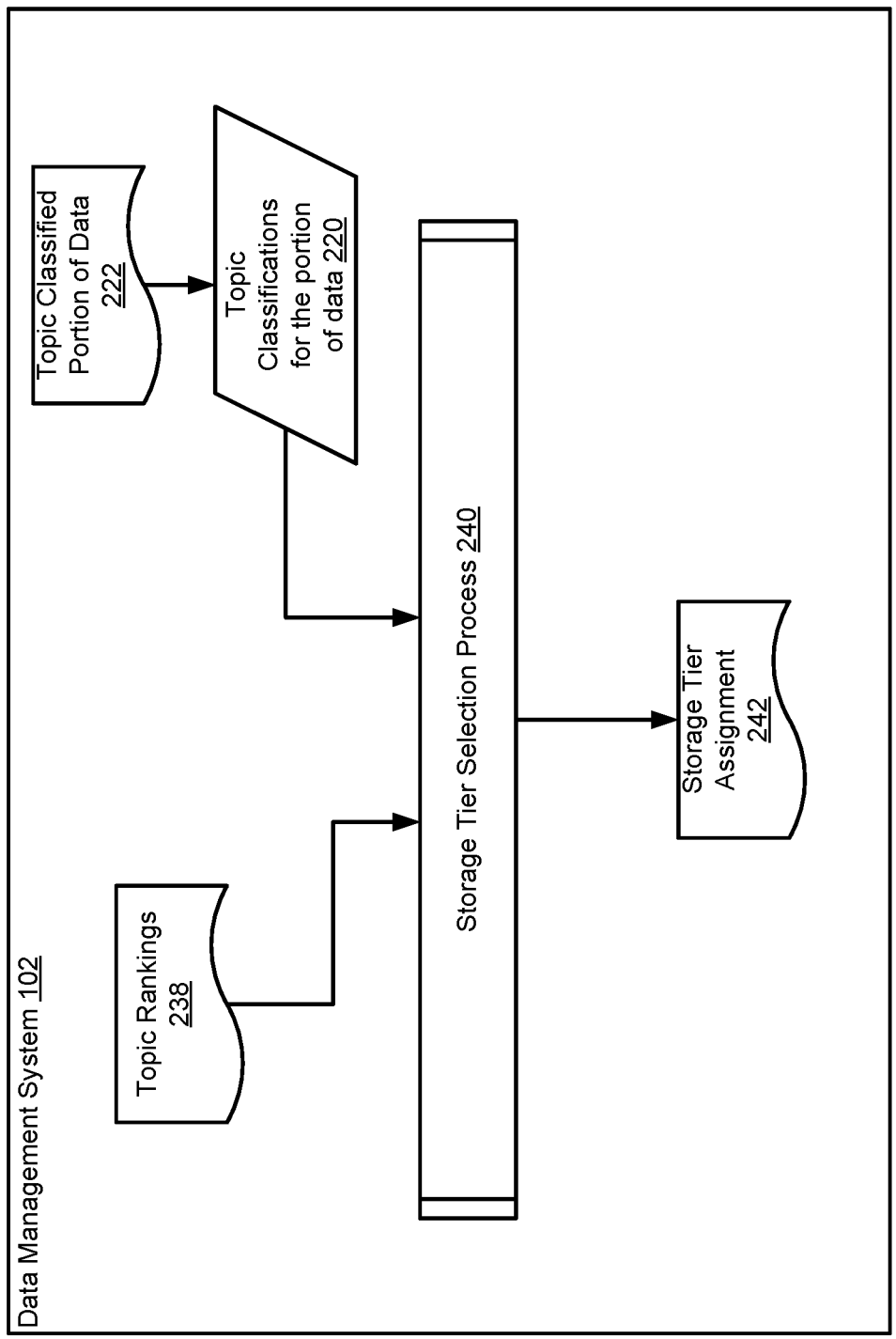

SYSTEM AND METHOD FOR MANAGING STORAGE OF DATA IN A SET OF STORAGE TIERS

FIELD

Embodiments disclosed herein relate generally to storage management. More particularly, embodiments disclosed herein relate to systems and methods to manage storage of data in a set of storage tiers.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

FIGS. 2A-2E show diagrams illustrating data flows in accordance with an embodiment.

DETAILED DESCRIPTION

Figure 1:
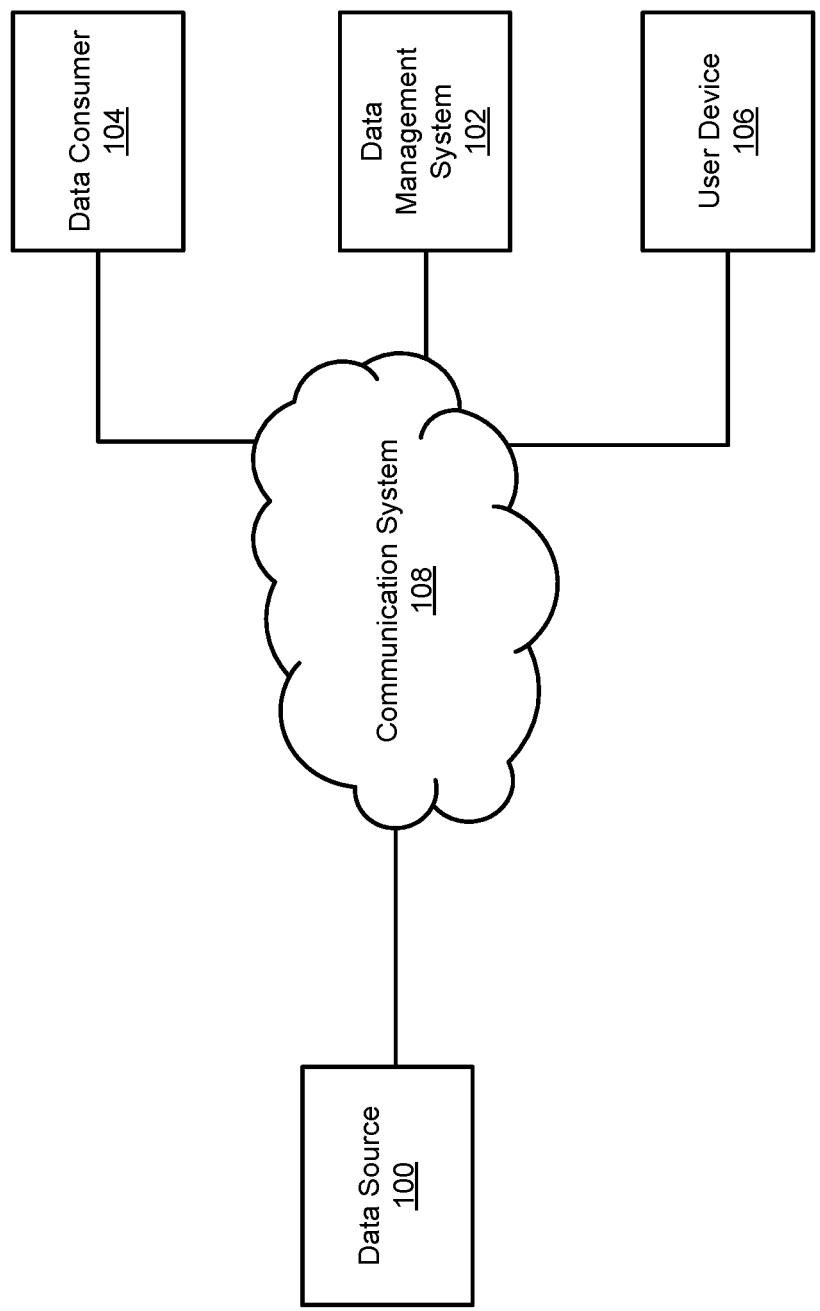
FIG. 1 shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing storage of data in a set of storage tiers. The data may be usable, for example, by (i) an individual for which the data is regarding, and (ii) other individuals to assist the individual. For example, the data may include medical information for an individual and the data may be usable by other individuals such as healthcare providers to diagnose and/or treat the individual for various medical conditions.

The set of storage tiers may include a finite number of storage resources thereby limiting the amount of data that may be stored, as well as the relative level of performance in accessing the stored data. Some portions of data may include data that is more relevant or helpful for an individual and/or other individuals than other portions of data. Thus, storing relevant portions of data in low performance storage tiers may be disadvantageous for the individual by reducing the ability of the desired services to be provided using the data.

To manage storage of data in a set of storage tiers, a data management system may prioritize storage of data on the basis of relevancy of the portions of data for one or more purposes with respect to an individual. To discriminate more relevant data from less relevant data, the data management system may analyze data being collected and stored, audio recordings of interactions between the individual and other individuals that provide services, and/or other types of data that may include information identifying relevant content to the individual for which the data is stored.

By identifying relevant content to the individual, the system may establish topics that are relevant to the individual and prioritize storage of data including and/or relating to the topics over storage of data relating to other topics. The data management system may update the topics relevant to the individual and/or adjust relevancy rankings of the topics as new information regarding the topics is obtained. By proactively updating the relevant topics and relevancy rankings for the topics, the data management system may be more likely to store more desirable data in higher performing storage tiers and store the less desirable data in lower performing storage tiers.

Thus, embodiments disclosed herein may provide an improved system for managing storage of data in a set of storage tiers. The improved storage management system may discriminate more relevant data from less relevant data based on topics relevant to the individual for which the data is being stored. Relevancy ratings of the topics relevant to the individual may be adjusted dynamically as new information is obtained by the system. By doing so, a system in accordance with embodiments disclosed herein may more efficiently marshal limited resources for storage of data by implementing a framework through which prioritizes storage of data for different types of storage based on the relevancy of the data for one or more purposes with respect to the individual.

In an embodiment, a method for managing storage of data in a set of storage tiers is disclosed. The method may include obtaining a portion of data for storage in the set of storage tiers managed by a data management system; identifying a topic classification of topic classifications for the portion of data; selecting a storage tier from the set of storage tiers using the topic classification for the data and topic rankings for the topic classifications; and storing the portion of data in the selected storage tier.

The portion of data may be obtained from the storage tier due to a change in topic classifications previously used to classify the portion of the data.

The portion of data may be obtained from a data source for storage by the data management system. The portion of data from the data source may be unclassified with respect to topic classifications that the data management system uses for classification purposes.

The topic classifications may be based at least in part on an audio transcript, the audio transcript may be based on an audio file, and the audio file may include audio data based on at least one conversation between two people.

The topic classifications may include an enumeration of each unique topic of topics discussed during the at least one conversation between the two people captured in the audio transcript; and the two people may include a first person for which the data is stored in the data management system, and a second person which provides at least one service to the first person.

Each of the storage tiers may include an amount of limited storage resources allocated to the respective storage tier, the amount of the limited storage resources may be allocated to each of the storage tiers is different.

The topic rankings may specify a rank ordering of the topic classifications.

Selecting the storage tier from the set of storage tiers may include: obtaining a relevancy quantification for the portion of data using the topic classification and the topic ranking, the relevancy quantification indicating a relevancy of the portion of data; and identifying the storage tier, based on the relevancy quantification, for the portion of data.

Identifying the storage tier may include: rank ordering portions of the data based on corresponding relevancy quantifications to obtain rank ordered portions of data, the portions of the data comprising the portion of the data; and assigning each of the rank ordered portions of data to the storage tiers based on storage resources of the storage tiers and sizes of the rank ordered portions to preferentially store higher ranked ordered portions of the data in higher performance storage tiers of the storage tiers.

Identifying the storage tier may further include: identifying a relevancy quantification range that is associated with a storage tier of the storage tiers and in which the relevancy quantification falls; and selecting the storage tier for storage of the portion of data.

In an embodiment, a non-transitory media is provided. The non-transitory media may include instructions that when executed by a processor cause the computer-implemented method to be performed.

In an embodiment, a data processing system is provided. The data processing system may include the non-transitory media and a processor, and may perform the computer-implemented method when the computer instructions are executed by the processor.

Turning to FIG. 1, a block diagram illustrating a system in accordance with an embodiment is shown. The system shown in FIG. 1 may provide computer-implemented services. The computer-implemented services may include data management services, data storage services, data access and control services, database services, and/or any other type of service that may be implemented with a computing device.

The system may include data management system 102. Data management system 102 may provide all, or a portion, of the computer-implemented services. To provide the computer-implemented services, data may be stored in data management system 102. The data stored in data management system 102 may include data usable (i) by an individual for which the data is stored, (ii) by other individuals to assist the individual, and/or (iii) by other individuals for other types of use. For example, the data may include healthcare information for an individual and the data may be usable by other individuals such as healthcare providers to diagnose and/or treat the individual for various health conditions.

The data stored in data management system 102 may be collected from data source 100. While illustrated with respect to a single data source, the system of FIG. 1 may include any number of data sources through which data management system 102 may obtain data. Data source 100 may include hardware and/or software components configured to obtain data, store data, provide data to other entities, and/or to perform any other task to facilitate performance of the computer-implemented services.

For example, an individual's healthcare information may be obtained from a healthcare provider system (e.g., data source 100) for use by the individual and/or other individuals (via associated devices). The data collected from data source 100 may include any quantity, size, and type of data. The data may include, for example, an audio recording (e.g., audio file) of a conversation between an individual and a healthcare provider, digitized results of medical tests, etc.

By storing data in data management system 102, the aggregated data may be usable for a variety of purposes. For example, in the healthcare context, the data may be usable for diagnostic purposes, verification purposes (e.g., second opinions), to facilitate studies by third parties that may use the data, etc. While described with respect to the healthcare services context, it will be appreciated that data may be stored in data management system 102 for other purposes and/or with respect to other contexts. For example, the stored data may be relevant for other types of services, uses, etc. without departing from embodiments disclosed herein.

However, storing data in data management system 102 may consume limited storage resources available to data management system 102. For example, data management system 102 may have a finite amount of storage resources for storing data. Additionally, hardware devices (e.g., hard disk drives, solid state drives, tape drives, etc.) of data management system 102 may limit the rate at which data may be stored and accessed. Consequently, only some of the data stored in data management system 102 may be accessed more quickly, while other portions may require more time to access the data.

In general, embodiments disclosed herein may provide methods, systems, and/or devices for managing storage of data in data management systems. The data may be managed in a manner that balances prioritizing storage of relevant data and storage performance against the limited amount of resources of data management systems. For example, data management system 102 may (i) identify portions of stored data for reclassification in order to maximize the use of limited resources, (ii) manage storage of new data for an individual in different performance storage tiers to maximize the use of limited resources, and/or (iii) perform other types of data storage management actions with respect to various portions of data managed by data management system 102.

Data management system 102 may select the portions of data for performance of storage management actions on the basis of relevancy of the portions of data for one or more purposes. For example, some portions of the data stored in the data management system may be more relevant or helpful for an individual and/or other individuals (e.g., service providers such as medical professional) to provide services to the individual than other portions of the data stored in the data management system. Delayed or limited access to relevant information for an individual may be disadvantageous for the individual by reducing the ability of the desired services to be provided using the data managed by data management system 102. Therefore, data management system 102 may prioritize storage of data based on the relevancy of the data for one or more purposes with respect to an individual.

In order to discriminate more relevant data from less relevant data, the data management system may analyze the data being collected and stored, audio recordings of interactions between the individual and other individuals that provide services (e.g., a purpose for the data) to the individual, and/or other types of data that may include content relevant to discerning purposes (e.g., topics) that are relevant to the individual for which the data is stored. For example, data management system 102 may analyze an audio recording of a conversation between an individual and a healthcare provider to identify medical conditions impacting the individual. Based on this identification, data management system 102 may establish topics that are relevant to the individual, and prioritize storage of data including and/or relating to the topics (e.g., in this example, diagnosis, treatment, etc. of these medical conditions) over storage of data relating to other topics.

As new information regarding the topics becomes available, the topics and relevancy ratings (e.g., some topics may be of higher relevancy) for the topics may be updated. Consequently, the topics for which storage of data is prioritized may be dynamically updated over time.

By dynamically updating the topics and relevancy rankings for the topics over time, embodiments disclosed herein may provide a storage system that is more likely to store data that is more desirable to an individual in higher performance storage, and store data that is less desirable to the individual in a lower performance storage. The disclosed embodiments may do so in an automated and/or semiautomated fashion thereby to reduce a cognitive burden on an individual for managing the data stored in limited storage resources of data management system 102.

To provide the above noted functionality, the system of FIG. 1 may include data source 100, data management system 102, data consumer 104, user device 106, and communication system 108. Each of these components is discussed below.

Figure 2A:
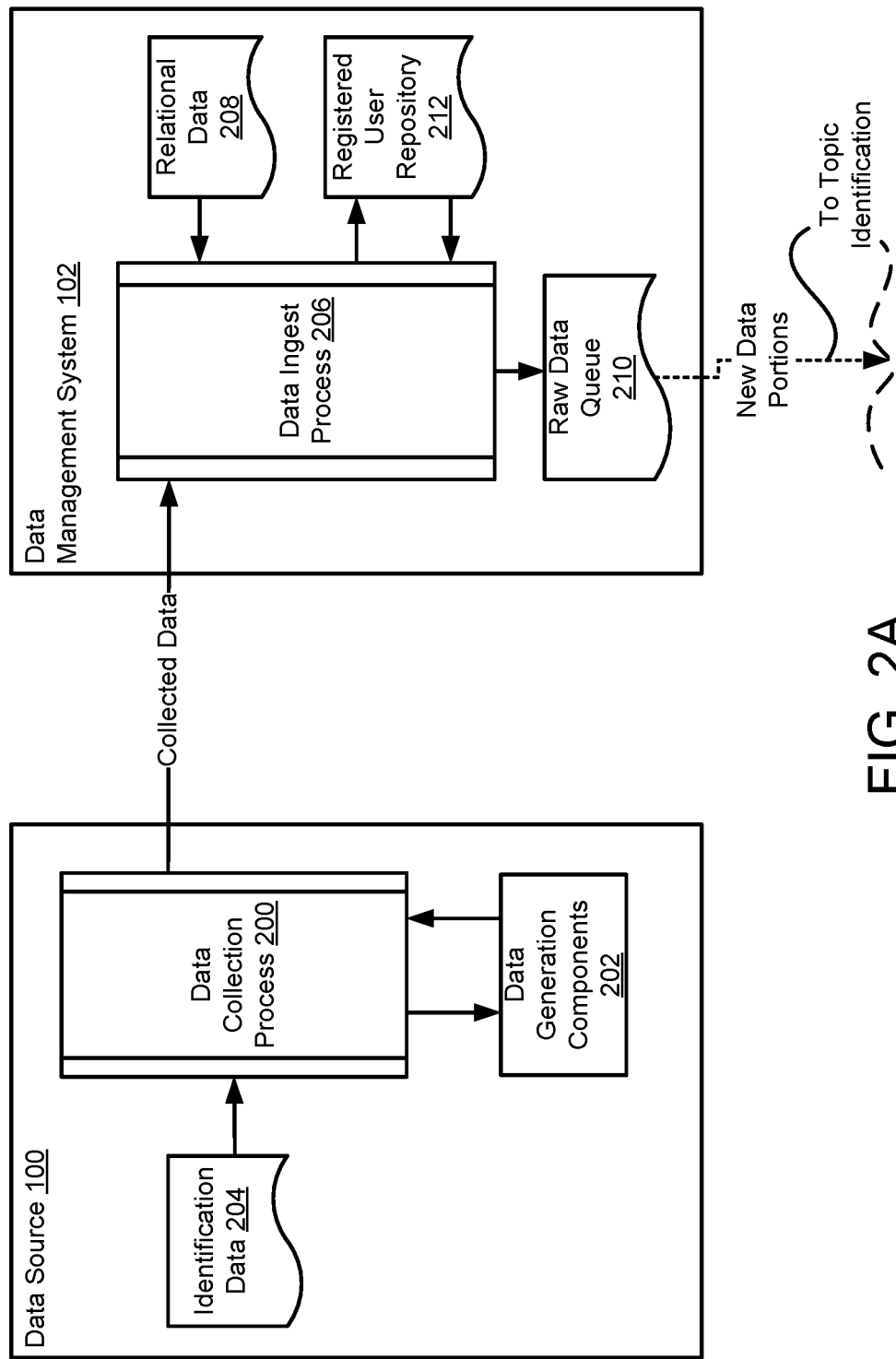

Data source 100 may (i) facilitate collection and transmission of data (e.g., regarding and/or relating to an individual) to data management system 102, (ii) provide information identifying the individual or entity sourcing the data to data management system 102, and/or (iii) otherwise facilitate collection of data by data management system 102. Data source 100 may be include a system operated by a medical provider which may collect, store, and/or provide access to data for a patient or individual, a personal device that collects information about an individual (e.g., cellphone, smart watch, etc.), and/or another type of data collection device. While described with respect to a medical provider, it will be appreciated that data source 100 may provide data related to other purposes without departing from embodiments disclosed herein. Refer to FIG. 2A for additional details regarding obtaining data using data source 100.

Data source 100 may be managed by (i) an individual or a patient for which the data is being collected, (ii) professional individuals that may provide a service for an individual, and/or (iii) other individuals or entities that may provide services for an individual. For example, data source 100 may be implemented using a professional medical device and/or another device operated by a medical provider.

To manage collection and storage of data, data management system 102 may (i) obtain a portion of data (e.g., from data source 100, from a data repository (not shown) within data management system, etc.), (ii) for audio data, perform a transcription process to obtain a text transcript of the audio data, (iii) perform an analysis of the text transcript of the data, (iv) based on the analysis of the text transcript, identify topic classifications and topic rankings for the topic classifications, (v) when a portion of data is obtained, perform a topic identification process to identify a topic classification for the portion of data, (vi) perform a storage tier selection process to identify storage location for data, and/or (vii) store data based on the result of the storage tier selection process. Similarly, data management system 102 may also provide access to stored data (e.g., to the individual for which the data is being managed and/or to data consumer 104). Refer to FIGS. 2B-2E for additional details regarding storing data.

Data management system 102 may be implemented with multiple computing devices. For example, data management system 102 may be implemented with a data center, cloud installation, or other type of computing environment. The computing environment may host a software stack for registering devices, and system for obtaining and managing privately held information.

Data consumer 104 may (i) obtain limited access to selective portions of data stored in data management system 102, (ii) submit requests for access to data stored in data management system 102 by a third party or other individual, (iii) provide information identifying the individual or entity requesting access to the data and/or other types of information upon which decisions to grant access may be based, and/or (iv) once a request for access is granted (e.g., by user device 106), obtain access to data stored in data management system 102 (e.g., data for which access has been granted based on the submitted requests).

User device 106 may facilitate (i) access and control over data stored in data management system 102 by an individual, (ii) designation of portions of data for use by other individuals (e.g., data consumer 104), and/or (iii) performance of other management operations. User device 106 may be registered with data management system 102. For example, data management system 102 may confirm the identity of user device 106 based on a registration of the device, the registration may indicate that user device 106 is being used by the user or individual.

Figure 3:
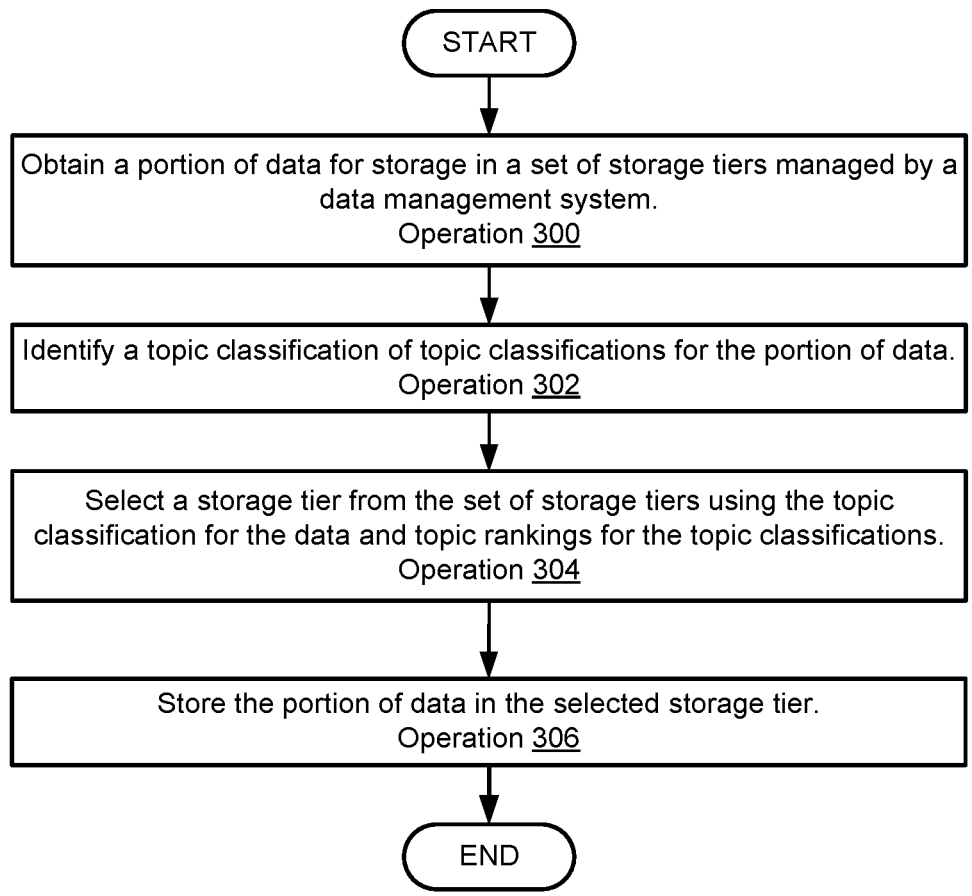
FIG. 3 shows a flow diagram illustrating methods of managing storage of data in accordance with an embodiment.

When providing their functionality, any of data source 100, data management system 102, data consumer 104, and/or user device 106 may perform all, or a portion, of the methods shown in FIG. 3.

Any of (and/or components thereof) data source 100, data management system 102, data consumer 104, and user device 106 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 4.

Any of the components illustrated in FIG. 1 may be operably connected to each other (and/or components not illustrated) with communication system 108. In an embodiment, communication system 108 includes one or more networks that facilitate communication between any number of components. The networks may include wired networks and/or wireless networks (e.g., and/or the Internet). The networks may operate in accordance with any number and types of communication protocols (e.g., such as the internet protocol).

While illustrated in FIG. 1 as including a limited number of specific components, a system in accordance with an embodiment may include fewer, additional, and/or different components than those illustrated therein.

To further clarify embodiments disclosed herein, diagrams illustrating data flows implemented by a system over time in accordance with an embodiment are shown in FIGS. 2A-2E.

Turning to FIG. 2A, a first data flow diagram illustrating data flows, data processing, and/or other operations that may be performed by the system of FIG. 1 in accordance with an embodiment is shown. In FIG. 2A, example flows between data source 100 and data management system 102 are shown. It will be appreciated that similar data flow with respect to any devices (e.g., devices that may collect and transmit data to data management system 102 such as user device 106) and data management system 102 may be present.

To provide computer-implemented services, data management system 102 may obtain and store data for an individual. Data management system 102 may obtain data from data source 100. To collect data, data source 100 may perform data collection process 200. During data collection process 200, data may be collected using data generation components 202. Data generation components 202 may include software components and/or hardware components of data source 100 necessary to perform data collection process 200.

For example, various sensors, generative, and display components of data source 100. The display components may be used to display prompts to a user of data source 100. The generative components may be used to generate various stimulations (e.g., optical, audio, etc.) of the user (e.g., so that data may be collected). The various sensors may be used to obtain information regarding the user and the impact of the stimulations on the user.

In addition, identification data 204 may be obtained during data collection process 200. Identification data 204 may include information regarding the identity of the individual for which the collected data is regarding/relating to. For example, identifying information such as the individual's name, date of birth, and/or any other identifying information for the individual for which the data is regarding. Identification data 204 may also include information regarding the identity of the user and/or entity operating data source 100. For example, identifying information such as the user's and/or entity's name, IP address, and/or any other information useful to identify the operator and/or manager of data source 100.

Identification data 204, the data collected (e.g., via data generation components 202), and/or identifying information (e.g., time stamps, cryptographic data, etc.) may be added to obtain collected data. The collected data may be provided to data management system 102. Data management system 102 may perform data ingest process 206 through which the collected data from data source 100 may be ingested.

During data ingest process 206, data management system 102 may receive and analyze the collected data using registered user data (e.g., association with the individual and/or user for which the data is regarding) from registered user repository 212 and relational data 208. Relational data 208 may specify relationships between different topic classifications of data and different individuals and/or entities that may consume the data (e.g., data consumer 104 shown in FIG. 1). Relational data 208 may be established by receiving authorization for selected individuals and/or entities from the individual for which the collected data is associated.

Data ingest process 206 may (i) identify the individual and/or entity from which the collected data is provided, (ii) identify the individual to which the collected data is to be associated, (iii) establish access controls for the collected data (e.g. using relational data 208), and/or (iv) add the collected data to raw data queue 210.

During data ingest process 206, data management system 102 may utilize the collected data (specifically identification data 204) and registered user repository 212 to identify the user and/or individual (e.g., associated data storage for the user and/or individual) for which the collected data is regarding. Data ingest process 206 may include performing a look up using registered user repository 212 to identify the registered user and/or individual for which the collected data is to be associated. The identifier for the user and/or individual may be added to the collected data ingested by data management system 102.

To manage aggregated data received from data source 100, data management system 102 may send the collected data (including relational data 208, the identifier for the user or individual for which the collected data is regarding, and/or any other information obtained during data ingest process 206) to raw data queue 210. Raw data queue 210 may facilitate further processing of the collected data. Raw data queue 210 may be implemented as, for example, first in first out queue.

Figure 2B:
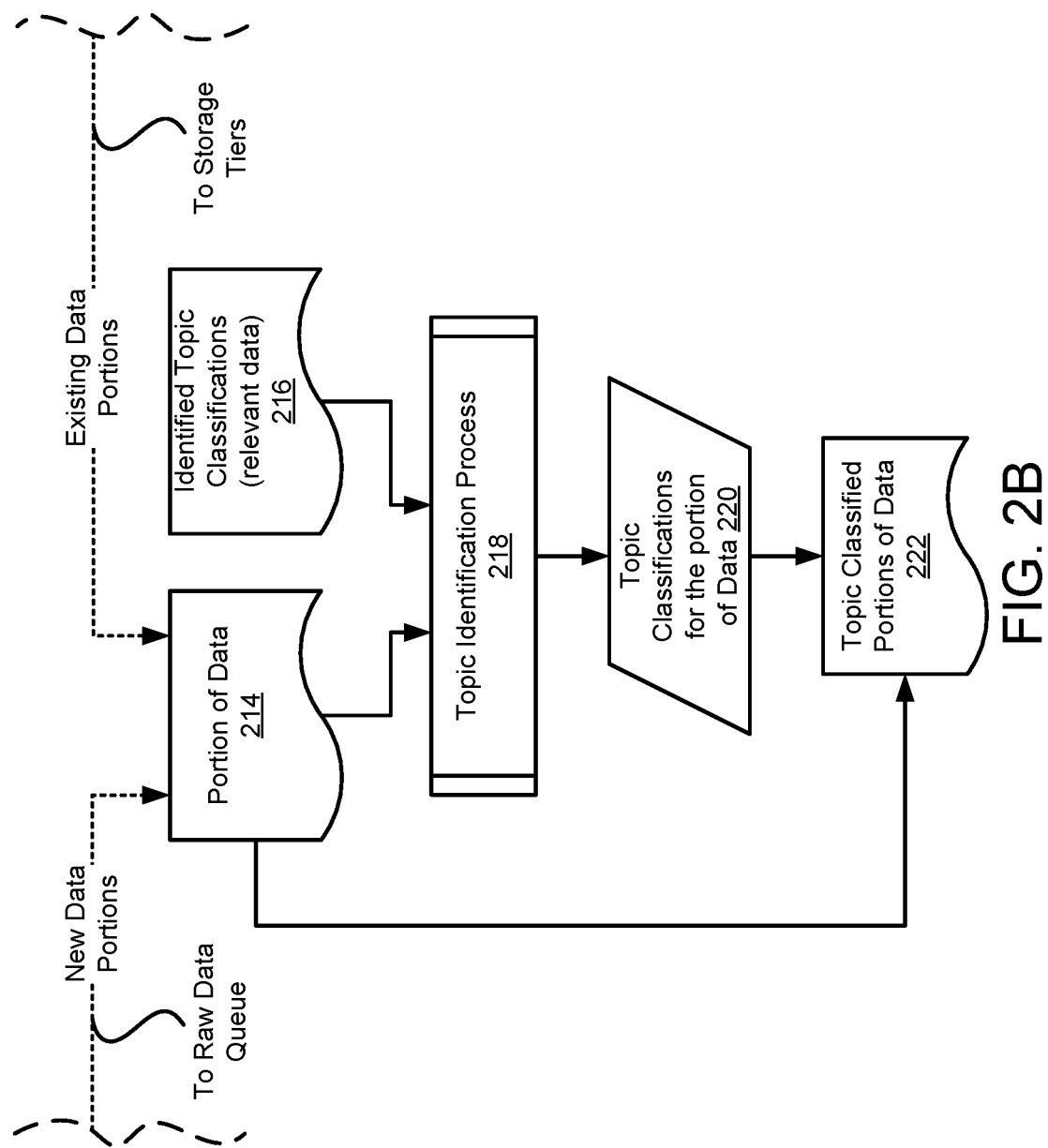

Turning to FIG. 2B, a second data flow diagram illustrating data flows, data processing, and/or other operations that may be performed by the system of FIG. 1 in accordance with an embodiment is shown. The data flows, data processing, and/or other operations may be performed when data is classified with respect to its relevancy to different topics.

As discussed above, the system may manage storage of data based on the relevancy of the data for one or more purposes with respect to an individual (e.g., for which the data is being managed and stored). To discriminate more relevant data from less relevant data, data management system 102 may classify portions of data based on topic classifications associated with the individual for which the portions of data are being stored.

Portion of data 214 may include new data portions obtained from a data source and/or existing data portions obtained from one of the storage tiers (e.g., storage tier A through storage tier N). In some instances, portion of data 214 may be obtained from data sources (and/or raw data queues within data management system 102) and may include unclassified data with respect to topic classifications that data management system 102 uses for classification purposes. For example, data management system 102 may obtain portion of data 214 (e.g., a new portion of data obtained from data source 100 via data ingest process 206 shown in FIG. 2A) from raw data queue 210 to use during topic identification process 218 (e.g., topic classification process).

As an additional example, portion of data 214 may be an existing portion of data that has been collected, classified (e.g., with respect to topic classifications), and stored in a storage tier (e.g., any of storage tier's 246A-246N). In some instances, portion of data 214 may include an existing data portion obtained from one of the storage tiers (e.g., storage tiers A through storage tier N) for the purpose of reclassifying the existing data portion, for example, if data management system 102 identifies or otherwise obtains a new topic classification for an individual's data (e.g., a change or update to identified topic classifications 216 previously used to classify the portion of data).

Figure 2C:
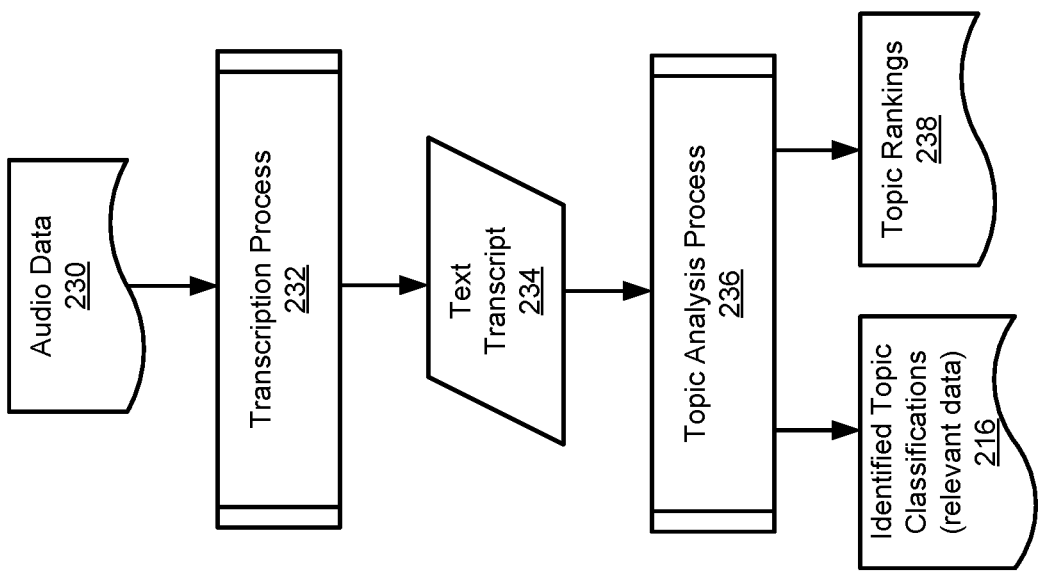

Identified topic classifications 216 may include a list of identifiers associated with various topics of data (e.g., types of data with similar content and/or subject matter) which may be relevant to the individual for which the data is regarding. Refer to FIG. 2C for additional details regarding obtaining topic classifications.

Topic identification process 218 may be performed to classify portion of data 214 with respect to topics specified by identified topic classifications 216. During topic identification process 218 portion of data 214 may be analyzed to identify any of the topics specified by identified topic classifications 216 to which portion of data 214 is relevant. For example, portion of data 214 may be analyzed using any classification process (e.g., trained machine learning models, expert rules, etc.) The result of performing topic identification process 218 may be a list of the topics from identified topic classifications 216 to which portion of data 214 is relevant.

Through topic identification process 218, topic classifications for the portion of data 220 may be obtained. Topic classifications may include the list of topics. Topic classifications for the portion of data 220 may be used as metadata for portion of data 214 so that the topics for which the portion of data 214 may be efficiently identified in the future.

Topic classifications for the portion of data 220 may be used to efficiently allow topics for which portion of data 214 is relevant to be identified. Topic classifications for the portion of data 220 may include information identifying the topic that is relevant to the portion of data. For example, topic classifications for the portion of data 220 may include one or more identifiers for the topic.

Topic classifications for the portion of data 220 may be used to aggregate portion of data 214 based on topic classifications to obtain topic classified portions of data 222. Topic classified portions of data 222 may include the identified topic classification (e.g., topic classification for the portion of data 220) for the portion of data and the portion of data (e.g., portion of data 214). For example, topic classified portions of data 222 may include one or more identifiers for the topic (e.g., identified via topic identification process 218) and portion of data 214. Topic classified portions of data 222 may be used during storage tier selection process 240 (shown in FIG. 2D) through which a storage tier for topic classified portions of data 222 may be selected. Refer to FIG. 2D for additional details regarding selecting a storage tier for data.

Turning to FIG. 2C, a third data flow diagram illustrating data flows during operation of obtaining topic classifications for data and topic rankings for the topic classifications by the system of FIG. 1 in accordance with an embodiment is shown.

As discussed above, to discriminate more relevant data from less relevant data, data management system 102 may analyze the data being collected and stored on behalf of an individual to identify types of data (e.g., topics) relevant to each respective individual. Data management system 102 may prioritize storage of data (e.g., and/or deletion of data if storage availability is limited) based on a ranking order (e.g., topic rankings 238) of the identified topics. Identifying types of data (e.g., topics) relevant to each individual may provide a more tailored and useful data storage management system for each individual.

The data being collected and stored in data management system 102 may include audio recordings of interactions (e.g., conversations) between an individual and other individuals that provide services (e.g., a purpose for the data) to the individual and/or other types of data that may include content relevant to discern purposes (e.g., topics) relevant to the individual for which the data is being collected and stored. In some instances, the collected data (e.g., received from data source 100 via data ingest process 206 shown in FIG. 2A) may include audio data 230 (e.g., audio files). For example, audio data 230 may include an audio recording of a conversation between a patient and a medical provider in which the two people discuss diagnosis, treatment, etc. for a particular type of medical condition such as diabetes.

In order to analyze audio data 230, the system may perform transcription process 232 through which audio data 230 may be analyzed and transcribed to obtain text transcript 234. Transcription process 232 may be performed by an inference model (not shown), artificial intelligence model (AI model), and/or any data processing system trained to perform natural language processes such as converting audio and/or voice data to text data (e.g., speech recognition process). For example, audio data 230 may be ingested by an inference model through which audio data 230 is analyzed and transcribed into a text format (e.g., text transcript 234).

Once text transcript 234 is obtained, topic analysis process may be performed in order to obtain relevant topic classifications for the data associated with an individual (e.g., identified topic classifications 216) and a ranking order for the topic classifications (e.g., topic rankings 238). Topic analysis process 236 may include analyzing text transcript 234 to identify topics (e.g., a defined group or category of data) included in the data and establish a relevancy rating for each topic (e.g., topic rankings 238). In some instances, topic rankings 238 may be based on the frequency of each topic (e.g., number of occurrences) identified in the data and/or on the opinion polarity (e.g., positive, neutral, negative, etc.) of each topic identified in the data. Topic rankings 238 may include identifiers for each topic classification and an assigned value (e.g., ranking order) for each topic classification.

Topic analysis process 236 may be performed by ingesting text transcript 234, for example, in an AI model (not shown) trained to perform text classification (e.g., topic labelling, sentiment analysis, etc.) of the data and to assign a rank order for each topic classification (e.g., identified via text classification). For example, an AI model may analyze text data (e.g., text transcript 234) regarding medical diagnosis, treatment, etc. for an individual and identify features (e.g., certain group of text or words) related to diabetes (e.g., topic). As such, the AI model may establish the topic of diabetes to be relevant to the individual and assign a relevancy value to the topic of diabetes (e.g., topic rankings 238).

Identified topic classifications 216 and topic rankings 238 may be stored in a data repository (not shown) within data management system 102 and may be updated as new data is collected (e.g., audio data 230). Continuing with the above example, data management system 102 may obtain and analyze additional audio data in which identifies a new topic (e.g., such as a new medical condition) of the data and assigns a higher relevancy value (e.g., topic ranking) to the new topic than compared to the topic of diabetes.

Now turning to FIG. 2D, a fourth data flow diagram illustrating data flows during selection of a storage tier for portions of data by the system of FIG. 1 in accordance with an embodiment is shown.

As discussed above, data management system 102 may select a storage tier in which to store the portion of data for an individual based the relevancy of the data for the individual. The relevancy of the data may be identified using relevancy rankings (e.g., topic rankings 238) for the topic classifications (e.g., topic classifications for the portion of data 220) identified for the portions of classified data (e.g., topic classified portion of data 222).

Storage tier selection process 240 may be performed to identify a storage tier in which to store topic classified portion of data 222. During storage tier selection process 240, a relevancy quantification for topic classified portion of data 222 may be obtained using topic classifications for the portion of data 220 and topic rankings 238. For example, relevancy quantification may be obtained by performing a comparison process (e.g., via a trained machine learning model, expert rules, etc.) using topic classifications for the portion of data 220 and topic rankings 238.

The relevancy quantification may indicate a relevancy of the portion of data for the individual for which the portion of data is associated. The relevancy quantification may be used during storage tier selection process 240 to identify the storage tier in which to store the portion of data (e.g., topic classified portion of data 222). Once obtained, the relevancy quantification may be used by (i) rank ordering portions of data based on the relevancy quantifications and assigning each of the rank ordered portions of data to storage tiers, (ii) identifying a storage tier that is associated with a relevancy quantification range for the portion of data, and/or (iii) by any other selection processes. For example, data management system 102 may perform a rank ordering process for portions of data (e.g., topic classified portion of data 222) based on corresponding relevancy quantifications and assign a storage tier for each portion of rank ordered data based on storage resources of the storage tiers and sizes of the rank ordered data. In this instance, data management system 102 may automatically/semiautomatically select to store higher ranked ordered data in higher performing storage tiers and vice versa. As a result, the limited amount of storage resources may be utilized to store more relevant data for an individual to quickly access over less relevant data.

As additional example, during storage tier selection process 240, data management system 102 may utilize a relevancy quantification for a portion of data by performing a matching process (e.g., trained machine learning model, expert rules, etc.) in which the relevancy quantification for the portion of data is compared to a relevancy quantification range that is associated with a storage tier. In this instance, the storage tier may be identified when the relevancy quantification for the portion of data is identified within a relevancy quantification range of one of the storage tiers.

The result of performing storage tier selection process 240 may be an identified storage tier in which topic classified portion of data 222 is to be stored. Through storage tier selection process 240, storage tier assignment 242 may be obtained. Assignment may include an identifier for one of the storage tiers managed by data management system 102. Storage tier assignment 242 may be used as metadata for topic classified portion of data 222 so that the storage tier in which to store topic classified portion of data 222 may be identified in the future.

Storage tier assignment 242 may be used to efficiently identify the storage tier in which topic classified portion of data 222 is to be stored in. Storage tier assignment 242 may include information identifying the storage tier that is assigned to the portion of data (e.g., topic classified portion of data 222). For example, storage tier assignment 242 may include one or more identifiers for the storage tier (e.g., any of storage tiers A 246A through storage tier N 246N).

Figure 2E:
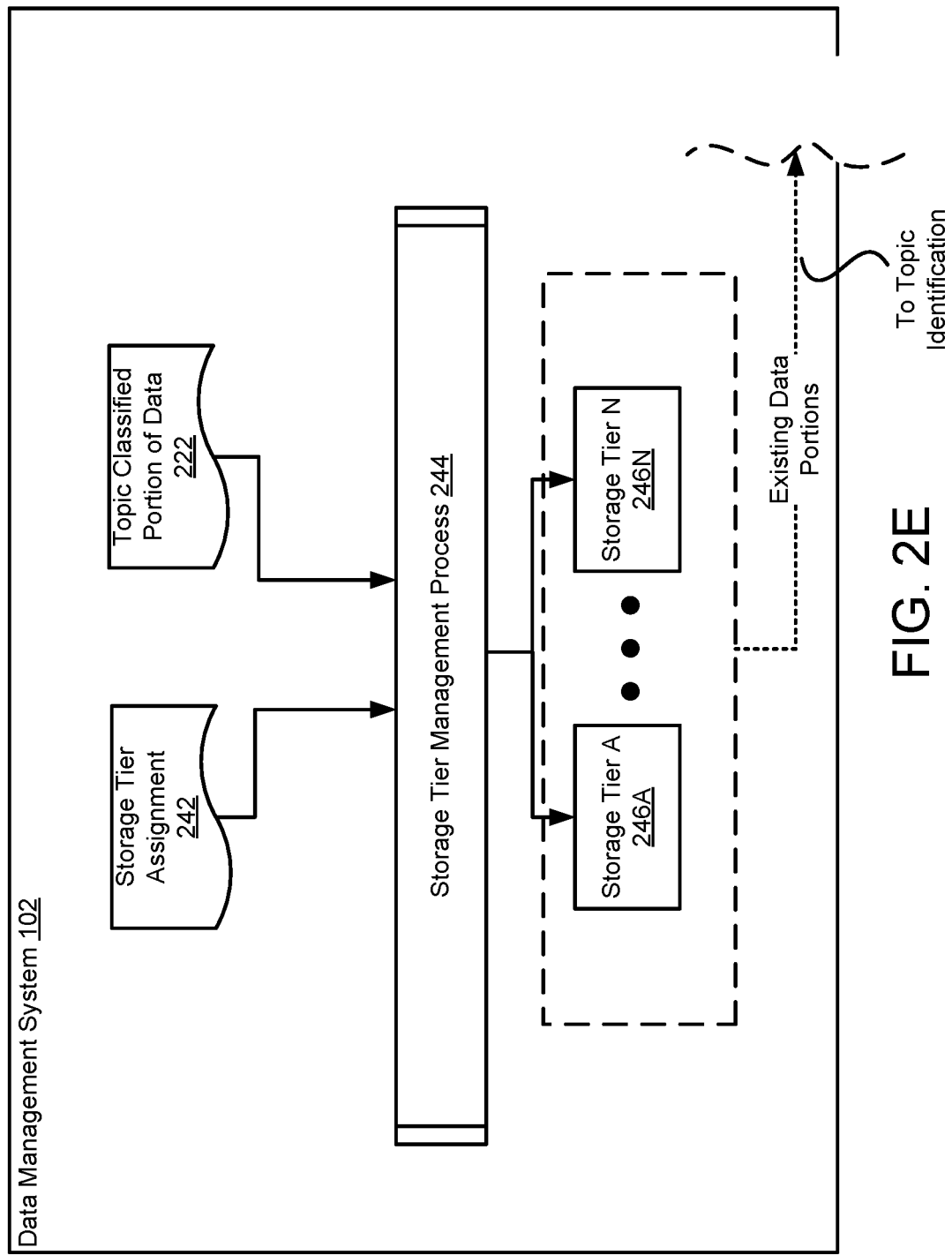

Storage tier assignment 242 may be used during storage tier management process 244). Refer to FIG. 2E for additional details regarding storing portions of data in storage tiers.

Now turning to FIG. 2E, a fifth data flow diagram illustrating data flows during operation of storing data in various storage tiers by the system of FIG. 1 in accordance with an embodiment is shown.

Storage tier management process 244 may be performed to store topic classified portion of data 222 in a storage tier as specified by storage tier assignment 242. During storage tier management process 244, storage tier assignment 242 may be used to identify which storage tier topic classified portion of data 222 should be stored in. For example, storage tier assignment 242 may be used in any matching process (e.g., trained machine learning models, expert rules, etc.). The result of performing storage tier management process 244 may be selecting a storage tier in which to store topic classified portion of data 222.

Through storage tier management process 244, a storage tier (e.g., storage tier A) from the storage tiers (e.g., storage tier A through storage tier N) may be identified and topic classified portion of data 222 may be stored within the identified storage tier. The storage tiers (e.g., storage tier A 246A, storage tier N 246N, etc.) may be used for storage of the portions of classified data (e.g., topic classified portion of data 222) for an individual to access and/or other individuals (e.g., with authorized access permitted by the individual) to have limited access in order to provide services to the individual.

In some instances, each storage tier of the storage tiers (e.g., storage tier A 246A-storage tier N 246N) may have a limited amount of storage resources allocated to each respective storage tier. Each of the storage tiers may have a different amount of limited storage resources allocated to each of the storage tiers which may limit the performance of the storage tier, and/or limit the types or amounts of data that may be stored in each of the storage tiers. For example, storage tier A 246A may be a higher performing storage tier in which some portions of data (e.g., highly relevant portions of data) may be more quickly read into memory to facilitate display of the portions of data for subsequent use by a user and/or individual. As such the limited resources may be utilized more efficiently to support storage of portions of data that are more relevant to an individual over storage of portions of data that are less relevant (e.g., less likely to be accessed for subsequent use).

As discussed above, the components of FIGS. 1-2E may perform various methods to manage operation of data processing systems. FIG. 3 illustrates a method that may be performed by the components of the system of FIGS. 1-2E. In the diagram discussed below and shown in FIG. 3 any of the operations may be repeated, performed in different orders, omitted, and/or performed in parallel with or in a partially overlapping in time manner with other operations.

Turning to FIG. 3, a flow diagram illustrating a method for managing storage space in a data management system in accordance with an embodiment is shown. The method may be performed, for example, by any of data source 100, data management system 102, data consumer 104, user device 106, and/or other components of the system shown in FIGS. 1-2D.

Prior to operation 300, a data management system may have obtained data for an individual and stored the data in a data repository within the data management system The data may have been obtained through various processes such as generation, acquisition from external entity (e.g., medical provider), acquisition from the individual whose data is being stored, and/or by any other method. The data may include data relating to healthcare information for an individual (e.g., medical records) and/or topics discussed during conversations between a first person and a second person. The data may be categorized and processed by the data management system based on topics (e.g., types of data) relevant to the individual for which the data is regarding.

At operation 300, a portion of data for storage in a set of storage tiers managed by a data management system may be obtained. The portion of data for storage may be obtained by (i) receiving the portion of data from a storage tier, (ii) receiving the portion of data from a data source (e.g., data source 100), and/or (iii) any other methods. The portion of data may be data that is unclassified with respect to topic classifications that the data management system uses for classification purposes. For example, the unclassified portion of data may be obtained from data source 100 by data management system 102. The portion of data that is classified and stored in a storage tier may be obtained due to a change in topic classifications previously used to classify the portion of data. For example, data management system 102 may obtain a classified portion of data from a storage tier (e.g., storage tier A 246A-storage tier N 246N) to use in order to reclassify the topic classification in which the portion of data has been classified.

At operation 302, a topic classification of topic classifications for the portion of data may be identified. The topic classifications may be identified by (i) reading the topic classifications from storage, (ii) obtaining the topic classifications via generation, and/or (iii) obtaining the topic classifications from another device. The topic classifications may be obtained via generation by analyzing portions of data, for example, audio transcripts (e.g., based on audio files) which may include a conversation between two people and identifying topics discussed between the two people.

Identifying the topic classifications via reading them from storage may include obtaining a list of topic classifications stored in a data repository within data management system and analyzing the portion of data to identify any of the topics specified by the list of topic classifications. For example, data management system 102 may obtain a list of topic classifications for an individual (e.g., identified topic classifications 216) and perform a classification process (e.g., using a trained machine learning model, expert rules, etc.) to classify the portion of data with respect to topics specified by the list of topic classifications.

At operation 304, a storage tier from the set of storage tiers may be selected using the topic classification for the data and topic rankings for the topic classifications. Selecting the storage tier from the set of storage tiers may include obtaining a relevancy quantification for the portion of data and identifying the storage tier for the portion of data based on the relevancy quantification. The relevancy quantification may indicate a relevancy of the portion of data. The relevancy quantification may be obtained (i) via generation using the topic classification and topic ranking for the portion of data, (ii) by receiving it from a third-party operating system trained to perform relevancy quantification processes, and/or (iii) by any other methods. The relevancy quantification for the portion of data may be obtained via generation, for example, by using a trained machine learning model to ingest the topic classification for the portion of data and topic rankings to identify the ranking order of the topic as specified by the topic rankings.

Identifying the storage tier for the portion of data based on the relevancy quantification may include (i) performing a rank ordering process for the portion of data and assigning each rank ordered portion of data to storage tiers based on storage resources and sizes of the rank ordered portion of data, (ii) identifying a relevancy quantification range that is associated with a storage tier of the storage tiers in which the relevancy quantification falls and selecting the storage tier for storage of the portion of data, and/or (iii) any other methods.

Identifying the storage tier based on rank ordering the portions of the data may include rank ordering portions of the data based on corresponding relevancy quantifications to obtain rank ordered portions of data. The portions of the data may include the portion of data (e.g., the portion of data for storage). Rank ordering portions of the data may be (i) performed by data management system or an operating system within data management system, (ii) performed by a third-party entity with an external operating system trained to perform rank ordering processes, and/or (iii) any other methods.

Once the portions of the data (including the portion of data for storage) are rank ordered, assigning each of the rank ordered portions of data to the storage tiers may be performed in order to identify the storage tier for the portion of data. Assigning each of the rank ordered portions of data to the storage tiers may include identifying storage resources of the storage tiers and sizes of the rank ordered portions of data to preferentially store higher ranked order portions of the data in higher performance storage tiers of the storage tiers. For example, data management system 102 may analyze the rank ordered portions of data (including the size of the rank ordered portions of data) and associate each of the rank ordered portions of data to the storage tiers based on the storage resources of the storage tiers. In this instance, data management system 102 may preferentially store higher ranked ordered portions of the data in higher performance storage tiers of the storage tiers.

In addition, identifying the storage tier for the portion of data based on the relevancy quantification may include identifying a relevancy quantification range that is associated with a storage tier of the storage tiers and in which the relevancy quantification falls; and selecting the storage tier for storage of the portion of data. To identify the relevancy quantification range that is associated with a storage tier may include, for example, performing a matching process (e.g., via trained machine learning model, expert rules, etc.) in which the relevancy quantification range associated with a storage tier may be analyzed to identify if the relevancy quantification for the portion of data falls within the relevancy quantification range. For example, data management system 102 may identify a relevancy quantification range in which the relevancy quantification for the portion of data falls within and based on the relevancy quantification range, data management system 102 may identify the storage tier associated with the respective relevancy quantification range in which to store the portion of data.

At operation 306, the portion of data may be stored in the selected storage tier. Storing the portion of data in the selected storage tier may be facilitated by (i) providing instructions to an operating system to store the portion of data in the selected storage tier, (ii) performing storage of the portion of data in the selected storage tier by the data management system, and/or (iii) any other method. For example, data management system 102 may provide a third party operating system with the portion of data, information regarding the selected storage tier, and any other metadata necessary to store the portion of data in the respective storage tier.

The method may end following operation 306.

Using the methods illustrated in FIG. 3, embodiments disclosed herein may facilitate storage of data in a set of storage tiers managed by a data management system. Managing storage of the data in the set of storage tiers may enable the data management system to automatically/semi-automatically prioritize more relevant data over less relevant data for an individual.

Figure 4:
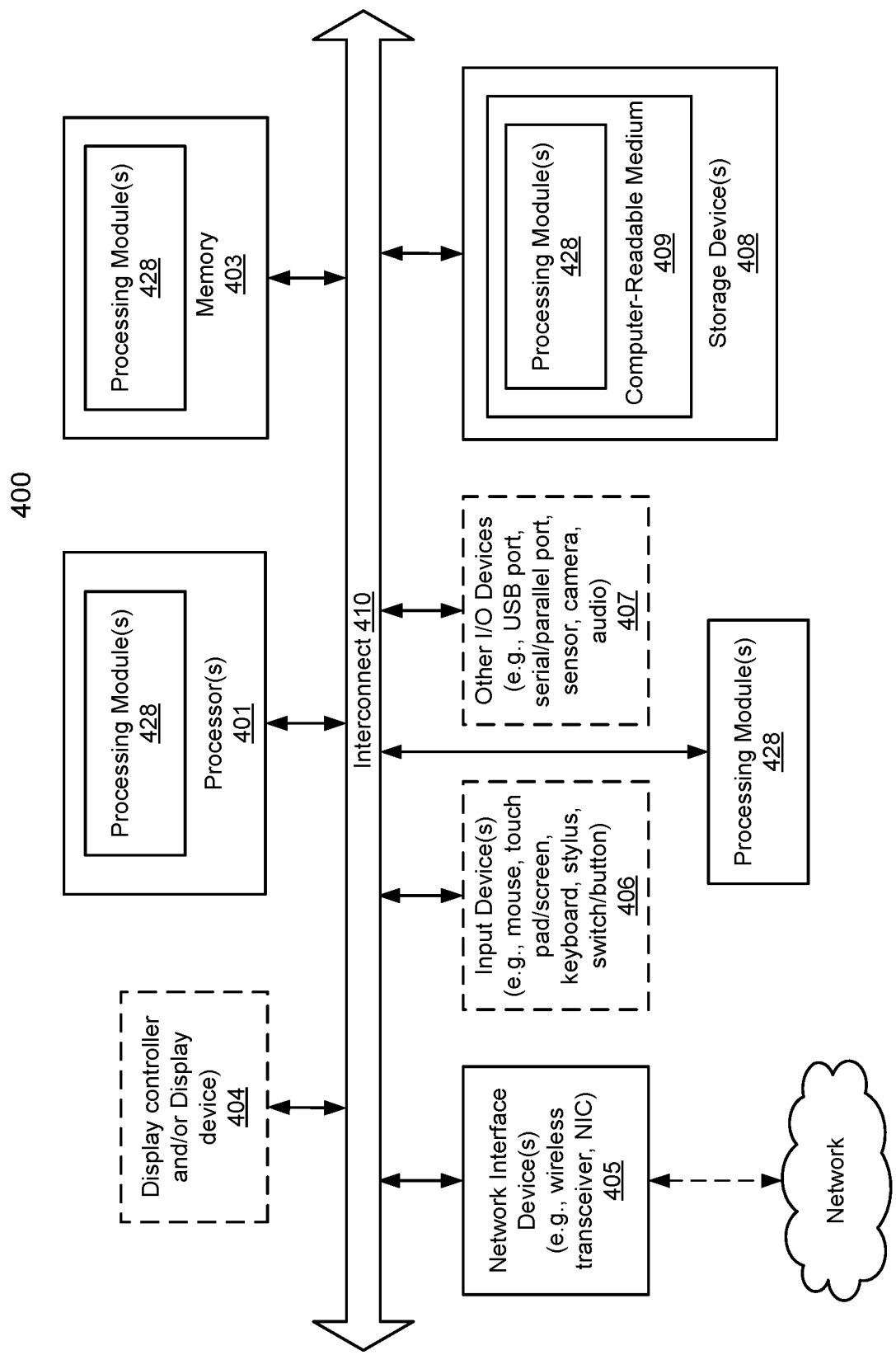
FIG. 4 shows a block diagram illustrating a data processing system in accordance with an embodiment.

Any of the components illustrated in FIGS. 1-2E may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing storage of data in a set of storage tiers, the method being executed by a hardware processor of a data management system and comprising:
obtaining a portion of the data, the set of storage tiers being managed by the data management system;

identifying a topic classification of topic classifications for the portion of the data;
selecting a storage tier from the set of storage tiers using the topic classification for the data and a topic ranking for each of the topic classification;
storing the portion of the data in the selected storage tier; and
after storing the portion of the data in the selected storage tier and further by the hardware processor of the data management system, dynamically marshalling finite computing resources of each storage tier of the set of storage tiers by at least:
detecting in real time that a change has occurred to the topic classification or to the topic ranking of the topic classification of the portion of the data, the change causing a level of storage performance of the selected storage tier to become inconsistent with a level of relevance of the portion of the data to a user for which the set of storage tiers are being used to store the portion of the data;
determining, based on the change, that the portion of the data should no longer be stored in the selected storage tier; and
dynamically moving, based on the determination, the portion of the data to another storage tier different from the selected storage tier based on the change to prevent the portion of the data from taking up finite computing resources of the selected storage tier that the portion of the data should no longer be stored in, wherein the dynamic marshalling is executed in real time by the hardware processor for all of the data stored in the set of storage tiers,
wherein prior to identifying the topic classification of the topic classifications for the portion of the data, the method further comprises:
generating a first set of topics for the portion of the data using a classification model hosted by the data management system, the classification model being a machine learning model;
identifying different topics in at least one conversation between two people to generate a second set of topics for the data, the portion of the data being based on the at least one conversation;
identifying topics contained in the first set of topics that are also contained in the second set of topics as common topics between the first set of topics and the second set of topics; and
assigning the common topics as the topic classifications for the portion of the data.

2. The method of claim 1, wherein the portion of the data is already stored in the set of storage tiers before the portion of the data is obtained, and the portion of the data is obtained from one storage tier among the set of storage tiers.

3. The method of claim 1, wherein the portion of the data is obtained from a data source for storage by the data management system.

4. The method of claim 3, wherein the portion of the data from the data source is unclassified with respect to topic classifications that the data management system uses for classification purposes.

5. The method of claim 1, wherein the topic classifications are based at least in part on an audio transcript, the audio transcript being based on an audio file, and the audio file comprises audio data based on the at least one conversation between the two people.

6. The method of claim 1, wherein the topic ranking specifies a rank of the topic classification within a rank ordering of the topic classifications.

7. The method of claim 6, wherein selecting the storage tier from the set of storage tiers comprises:
obtaining a relevancy quantification for the portion of the data using the topic classification and the topic ranking, the relevancy quantification indicating a relevancy of the portion of the data; and
identifying the storage tier, based on the relevancy quantification, for the portion of the data.

8. The method of claim 7, wherein identifying the storage tier comprises:
rank ordering portions of the data based on corresponding relevancy quantifications to obtain rank ordered portions of data, the portions of the data comprising the portion of the data; and
assigning each of the rank ordered portions of data to the storage tiers based on storage resources of the storage tiers and sizes of the rank ordered portions to preferentially store higher ranked ordered portions of the data in higher performance storage tiers of the storage tiers.

9. The method of claim 7, wherein identifying the storage tier comprises:
identifying a relevancy quantification range that is associated with a storage tier of the storage tiers and in which the relevancy quantification falls; and
selecting the storage tier for storage of the portion of the data.

10. The method of claim 1, wherein
the change to the topic classification or to the topic ranking of the topic classification of the portion of the data that is detected in real time occurs when new information regarding the portion of the data is obtained by the data management system, and
the new information causing, automatically by the data management system and without direct intervention by a user of the data management system through a manual update of one or more values associated with the topic classification or the topic ranking of the topic classification by the user, at least one of:
the topic classification to be removed from the portion of the data, or
the topic ranking of the topic classification to change.

11. A non-transitory machine-readable medium having instructions stored therein, which when executed by a hardware processor, cause the hardware processor to perform operations for managing storage of data in a set of storage tiers, the operations comprising:
obtaining a portion of the data, the set of storage tiers being managed by a data management system;
identifying a topic classification of topic classifications for the portion of the data;
selecting a storage tier from the set of storage tiers using the topic classification for the data and a topic ranking for each of the topic classifications;
storing the portion of the data in the selected storage tier; and
after storing the portion of the data in the selected storage tier and further by the hardware processor as part of the operations, dynamically marshalling finite computing resources of each storage tier of the set of storage tiers by at least:
detecting in real time that a change has occurred to the topic classification or to the topic ranking of the topic classification of the portion of the data, the change causing a level of storage performance of the selected storage tier to become inconsistent with a level of relevance of the portion of the data to a user for which the set of storage tiers are being used to store the portion of the data;

determining, based on the change, that the portion of the data should no longer be stored in the selected storage tier; and dynamically moving, based on the determination, the portion of the data to another storage tier different from the selected storage tier based on the change to prevent the portion of the data from taking up finite computing resources of the selected storage tier that the portion of the data should no longer be stored in, wherein the dynamic marshalling is executed in real time by the hardware processor for all of the data stored in the set of storage tiers, wherein prior to identifying the topic classification of the topic classifications for the portion of the data, the operations further comprise:

generating a first set of topics for the portion of the data using a classification model hosted by the data management system, the classification model being a machine learning model;

identifying different topics in at least one conversation between two people to generate a second set of topics for the data, the portion of the data being based on the at least one conversation;

identifying topics contained in the first set of topics that are also contained in the second set of topics as common topics between the first set of topics and the second set of topics; and assigning the common topics as the topic classifications for the portion of the data.

12. The non-transitory machine-readable medium of claim 11, wherein the portion of the data is already stored in the set of storage tiers before the portion of the data is obtained, and the portion of the data is obtained from one storage tier among the set of storage tiers.

13. The non-transitory machine-readable medium of claim 11, wherein the portion of the data is obtained from a data source for storage by the data management system.

14. The non-transitory machine-readable medium of claim 13, wherein the portion of the data from the data source is unclassified with respect to topic classifications that the data management system uses for classification purposes.

15. The non-transitory machine-readable medium of claim 11, wherein the change to the topic classification or to the topic ranking of the topic classification of the portion of the data that is detected in real time occurs when new information regarding the portion of the data is obtained by the data management system, and the new information causing, automatically by the data management system and without direct intervention by a user of the data management system through a manual update of one or more values associated with the topic classification or the topic ranking of the topic classification by the user, at least one of:

the topic classification to be removed from the portion of the data, or the topic ranking of the topic classification to change.

16. A data processing system, comprising:
a hardware processor; and
a memory coupled to the hardware processor to store instructions, which when executed by the hardware processor, cause the hardware processor to perform operations for managing storage of data in a set of storage tiers, the operations comprising:

obtaining a portion of the data, the set of storage tiers being managed by a data management system;

identifying a topic classification of topic classifications for the portion of the data;

selecting a storage tier from the set of storage tiers using the topic classification for the data and a topic ranking for each of the topic classifications;

storing the portion of the data in the selected storage tier; and after storing the portion of the data in the selected storage tier and further by the hardware processor as part of the operations, dynamically marshalling finite computing resources of each storage tier of the set of storage tiers by at least:

detecting in real time that a change has occurred to the topic classification or to the topic ranking of the topic classification of the portion of the data, the change causing a level of storage performance of the selected storage tier to become inconsistent with a level of relevance of the portion of the data to a user for which the set of storage tiers are being used to store the portion of the data;

determining, based on the change, that the portion of the data should no longer be stored in the selected storage tier; and dynamically moving, based on the determination, the portion of the data to another storage tier different from the selected storage tier based on the change to prevent the portion of the data from taking up finite computing resources of the selected storage tier that the portion of the data should no longer be stored in, wherein the dynamic marshalling is executed in real time by the hardware processor for all of the data stored in the set of storage tiers, wherein prior to identifying the topic classification of the topic classifications for the portion of the data, the operations further comprise:

generating a first set of topics for the portion of the data using a classification model hosted by the data management system, the classification model being a machine learning model;

identifying different topics in at least one conversation between two people to generate a second set of topics for the data, the portion of the data being based on the at least one conversation;

identifying topics contained in the first set of topics that are also contained in the second set of topics as common topics between the first set of topics and the second set of topics; and assigning the common topics as the topic classifications for the portion of the data.

17. The data processing system of claim 16, wherein the portion of the data is already stored in the set of storage tiers before the portion of the data is obtained, and the portion of the data is obtained from one storage tier among the set of storage tiers.

18. The data processing system of claim 16, wherein the portion of the data is obtained from a data source for storage by the data management system.

19. The data processing system of claim 16, wherein the change to the topic classification or to the topic ranking of the topic classification of the portion of the data that is detected in real time occurs when new information regarding the portion of the data is obtained by the data management system, and the new information causing, automatically by the data management system and without direct intervention by a user of the data management system through a manual update of one or more values associated with the topic classification or the topic ranking of the topic classification by the user, at least one of:
   the topic classification to be removed from the portion of the data, or
   the topic ranking of the topic classification to change.

20. The data processing system of claim 16, wherein the topic ranking specifies a rank of the topic classification within a rank ordering of the topic classifications.

\* \* \* \* \*